Aug. 8, 1939.                    J. SHYER                    2,169,075
                 ANTIGLARE SHIELD FOR GOGGLES AND SUNGLASSES
                  Filed March 23, 1938        2 Sheets-Sheet 1
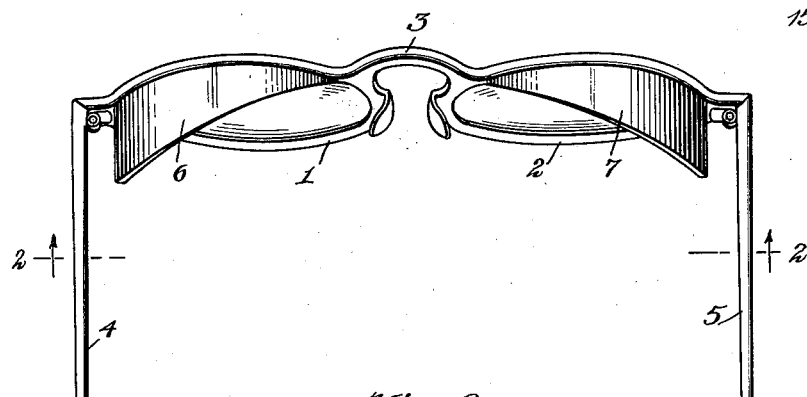
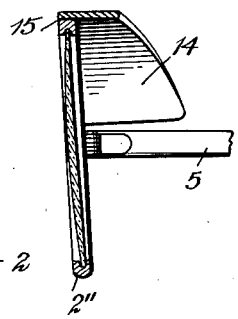
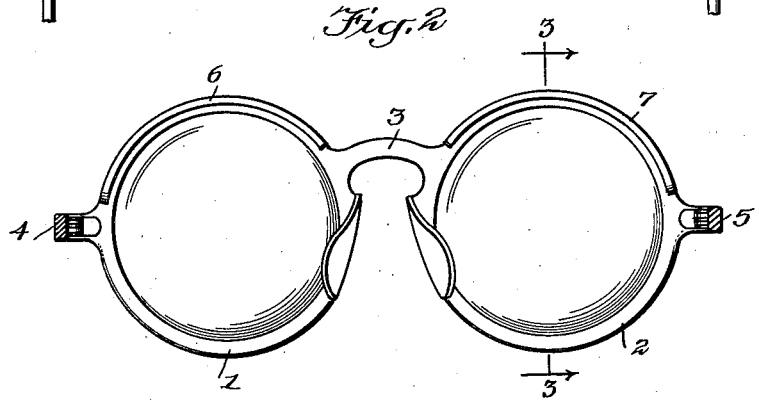
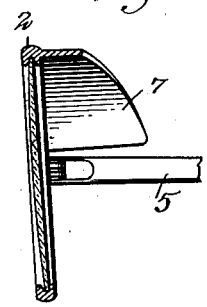
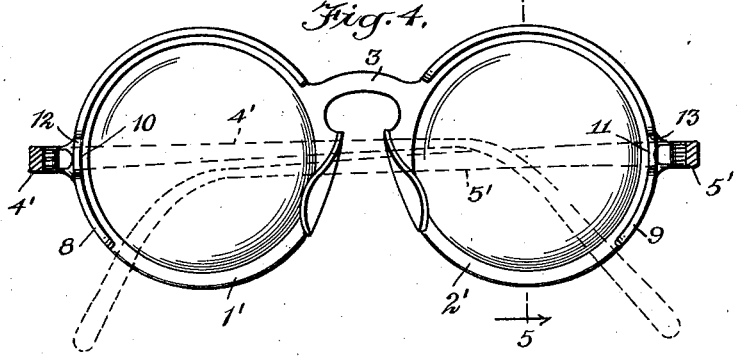
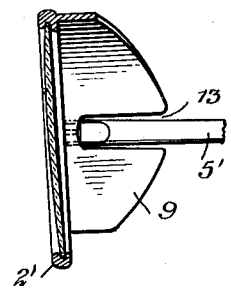
INVENTOR
Joseph Shyer
BY
Munn, Anderson & Liddy
ATTORNEYS Aug. 8, 1939.    J. SHYER    2,169,075
ANTIGLARE SHIELD FOR GOGGLES AND SUNGLASSES
Filed March 23, 1938    2 Sheets-Sheet 2
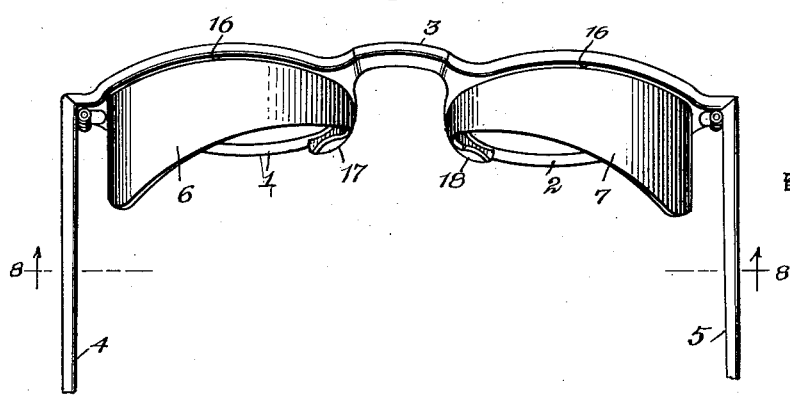
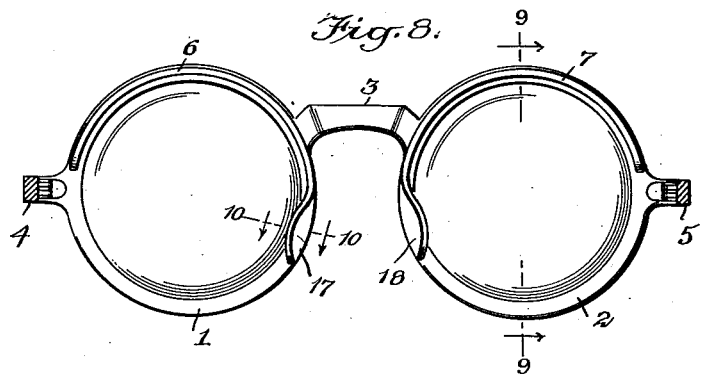
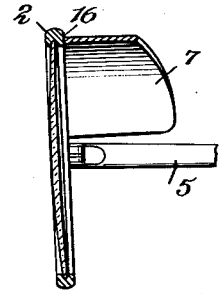
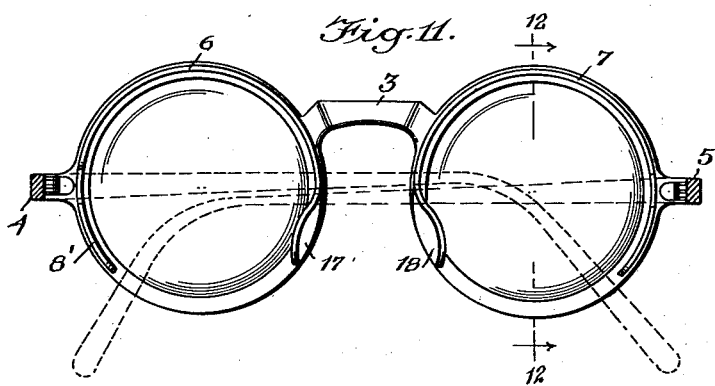
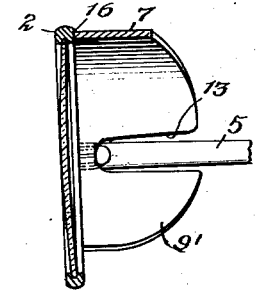
WITNESSES
INVENTOR
Joseph Shyer
BY
ATTORNEYS Patented Aug. 8, 1939

2,169,075

UNITED STATES PATENT OFFICE 2,169,075

ANTIGLARE SHIELD FOR GOGGLES AND SUNGLASSES

Joseph Shyer, Belle Harbor, N. Y., assignor to Zylo Ware Corporation, New York, N. Y., a corporation of New York Application March 23, 1938, Serial No. 197,595

2 Claims. (Cl. 2—12)

This invention relates to goggles and sun glasses, and particularly to an improved structure including an anti-glare shield, an object being to provide a desired form of goggles with a shield for conformance to the shape of the goggles and, at the same time, protecting the eyes against glaring light.

Another object of the invention is to provide a shield for goggles which is connected to the goggles near the upper part of the lens frames with the rear or inner part arranged at angles to conform to the shape of the face.

A further object of the invention is to provide an anti-glare shield for goggles wherein the goggles may be arranged so as to contact with the rear or surface of the goggles nearest the face, or on the upper peripheral part of the lens frames, and present shielding members that do not detract from the appearance of the goggles, and which at the same time provide a shielding structure which protects the eyes against glaring light from the top or sides.

A further and more specific object of the invention is to provide an anti-glare shield for the lens frames of goggles which may be separate and secured in place or which may be made integral with the goggles, and which may cover only the upper part of the lens frames or cover this part and a portion of the sides.

In the accompanying drawings—

Fig. 1 is a top plan view of a pair of goggles fitted with an anti-glare shield embodying the invention, the temples of the goggles being partly broken away;

Fig. 2 is a sectional view through Fig. 1 approximately on the line 2—2;

Fig. 3 is a transverse sectional view through Fig. 2 approximately on the line 3—3;

Fig. 4 is a view similar to Fig. 2 but showing a slightly modified construction wherein the shield extends around to protect against glaring light from the sides;

Fig. 5 is a sectional view through Fig. 4 approximately on the line 5—5;

Fig. 6 is a view similar to Fig. 3 but showing a slightly modified construction wherein the shield is held in place by adhesion;

Fig. 7 is a view similar to Fig. 1 but showing a slightly modified construction;

Fig. 8 is a sectional view through Fig. 7 approximately on the line 8—8;

Fig. 9 is a sectional view through Fig. 8 approximately on the line 9—9;

Fig. 10 is a detail fragmentary sectional view through Fig. 8 approximately on the line 10—10;

Fig. 11 is a further modified form of the invention illustrating the nose bridge structure of Fig. 2 and the side shield formation as illustrated in Fig. 5;

Fig. 12 is a sectional view through Fig. 11 approximately on the line 12—12.

Referring to the accompanying drawings by numerals, 1 and 2 indicate the lens frames which are connected by a suitable nose bridge 3 and which are also provided with suitable temples 4 and 5. The construction just described is old and well-known and forms no part of the present invention except in combination.

Associated with the frames 1 and 2 are shields 6 and 7 which are of identical construction except that one is made for the right frame and the other for the left frame and therefore a description of one will apply to the other. As illustrated in Figs. 1, 2 and 3, the shields 6 and 7 are made integral with the frames 1 and 2 but they could be made separate as hereinafter fully set forth. As shown particularly in Fig. 3, the shield 7 is formed integral with the frame 2 and extends inwardly or toward the face at a point substantially midway of the thickness of the frame 2. It will be understood that the goggle structure 1 to 5, inclusive, may be made of any desired material, as for instance a plastic material. As an example, the goggle structure may be made from a plastic material known as "Zylomite". Also it is to be understood that the shields 6 and 7 may be made of any color and any material. The coloring matter may be in the material when it is manufactured, if it is formed of a plastic material as above mentioned, or it could be made opaque, clear, or translucent and then colored with paint or dye to the desired shade; also it will be understood that the inner edge of the shield is preferably of a desired shape to fit the face of a person when the goggles are in use.

In Figs. 4 and 5 a slightly modified structure to that shown in Fig. 1 is disclosed. This modification consists in providing the extensions 8 and 9 extending around the sides of the respective frames 1' and 2' so as to protect the eyes against glaring light from the sides. As illustrated in Fig. 4, the shield is reduced in height at the points 10 and 11 so as to present temple openings 12 and 13 for the respective temples 4' and 5'. The temples will substantially fill the respective openings so that the eyes will be properly protected from above and from the sides.

In Fig. 6 a further slightly modified structure is presented wherein the frame 2' is made in the conventional way and the shield 14 is made of the desired shape, as for instance the shape shown in Fig. 2, and is then secured in place by suitable adhesive 15 on part of the peripheral edge of the frame. If desired, the shield 14 could be cemented or otherwise secured to the side edge 2" so as to project in the same manner as shown in Fig. 5.

As Figs. 7 to 12 disclose a modified construction to that illustrated in Fig. 2, the same reference numerals will be used except for the modified parts. Referring more particularly to these figures, it will be seen that the shields 6 and 7 are secured to the inner edge 16 of the lens frame 2. The shield may be secured in place by adhesion, but it is preferably softened by solvent or the frame 2 is softened and then the parts pressed together. This in a certain sense will weld the parts together especially if they are made out of the same plastic material.

It will be observed particularly from Fig. 8 that the shields 6 and 7 are carried down and form respective nose pads 17 and 18 which may be shaped as the nose pads shown in Fig. 2, or formed of other shapes as preferred.

Figs. 11 and 12 show the same frames as shown in Figs. 7 and 8 except that the respective shields 6 and 7 extend around the sides to form the lower side panels or extensions 8' and 9' similar to the extensions 8 and 9 of Fig. 4. By this construction the eye is completely encircled except the lower part and thereby a desired protecting shield is provided against the glare of strong light.

It will also be noted that in the forms of the invention shown in Figs. 7 to 12, the shields are on the inner surface of the frames, that is, between the frames and the face of the person. In these forms of the invention the frames and the shields may be made of the same material and also the same color or shape. It will be understood, of course, that any desired kind of lens may be carried by the frames 1 and 2. It will further be noted that in all forms of the invention the anti-glare shield extends from the frame inwardly or toward the face and not outwardly. In this way the vision of the person using the goggles is not impaired and yet the eyes are amply protected against glaring light from above and from either side.

While the goggles and shields may be made of different colors it has been found desirable to make them both of the same color or substantially the same color.

I claim:

1. The combination with goggles provided with a pair of lens frames having a nose bridge and a pair of temples pivotally connected to the frames, of a shield for each frame conforming in shape to the peripheral part of the frame and presenting an arc-shaped structure including more than a half circle, each of said shields merging at one end into a nose pad positioned below said nose bridge and a notch adjacent the other end above the plane of said pad and in line with the pivotal mounting of said temples for permitting said temples to be folded to extend through said notches and rest against said frames immediately above said pads.

2. The combination with goggles provided with a pair of lens frames having a nose bridge and a pair of temples pivotally connected to the frames at opposite ends thereof, of a shield for each frame conforming in shape to the peripheral part of the frame and presenting an arc-shaped structure including approximately a half-circle with the outer end immediately above the pivotal mounting of the temples and the inner end positioned below a straight line drawn from the pivotal mounting of one temple to the other, said inner end merging into a nose pad, whereby said temples may be folded against said frames above said pads with the end portions of the temples below the outer ends of said shield.

JOSEPH SHYER.